INVENTOR:
JOHANNES E. RIJNSDORP
BY:
HIS ATTORNEY

INVENTOR:
JOHANNES E. RIJNSDORP
BY: *N N Kunitz*
HIS ATTORNEY

INVENTOR:
JOHANNES E. RIJNSDORP
BY:
HIS ATTORNEY

INVENTOR:
JOHANNES E. RIJNSDORP
BY: *[signature]*
HIS ATTORNEY

United States Patent Office 3,342,700
Patented Sept. 19, 1967

3,342,700
METHOD AND APPARATUS FOR THE CONTROL OF A CONTINUOUSLY OPERATING SUPERATMOSPHERIC DISTILLATION PROCESS
Johannes E. Rijnsdorp, Amsterdam, Netherlands, assignor to Shell Oil Company, New York, N.Y., a corporation of Delaware
Filed Jan. 20, 1964, Ser. No. 338,835
Claims priority, application Netherlands, Jan. 28, 1963, 288,248
13 Claims. (Cl. 203—1)

This invention relates to a method and apparatus for the control of a continuously operating distillation process. More particularly, this invention relates to a method and apparatus for the control of a process for the continuous distillation of a variable stream of an intake mixture which is carried out at a pressure above atmospheric in a distillation column using both reflux in the top and re-evaporation in the bottom portion of the distillation column, and in which the rate of flow of the intake mixture remains independent of the conditions in the distillation process.

It is a general practice in the industry to provide automatic control for continuous distillation processes. Suitable correcting conditions in this regard are, in general, the amount of reflux, the degree of heat applied in aid of the re-evaporation (to the reboiler), the top product flow (take-off), the bottom product flow (take-off), the degree of cooling in the condenser, and the degree of preheating of the feed. The quality of the products is normally kept constant by controlling these conditions to maintain predetermined temperatures and pressures in the column.

Known control systems have their drawbacks since temperature and pressure are not always good criteria for product quality. Furthermore, operating at the predetermined pressures and temperatures which would result in the required quality of the products, does not always result in the optimization of the operating costs for the process. With the advent of suitable stream analyzers for producing a direct indication of the quality of the process products, it now becomes possible to remove the necessity of controlling the column pressure to a predetermined value. Since the variable costs of operating a distillation process are determined mainly by the cost of preheating the feed together with the cost of heating in aid of re-evaporation, and since the degree of re-evaporation is directly related to the pressure in the column, if then the process is controlled such that the pressure in the column is free to vary within the permissible operating limits of the column and the heat which is supplied to the reboiler is controlled in such a way that the minimum amount of heat need be transferred from the reboiler to the condenser to perfect the desired separation, the variable operating costs for the process can be reduced to a minimum.

As is often the case in practice, the components to be separated by the distillation have an increasing relative volatility at decreasing pressure. If now, the process is controlled in such a way that the pressure automatically adjusts itself to the lowest value at which the distillation process still produces the desired results, then accordingly as the pressure becomes lower, less reflux and vapor flow are required to obtain a desired separation. This implies that less heat need be transferred from the reboiler to the condenser to perfect the desired separation. This is obtained by supplying less heat to the reboiler, resulting in a reduction of the variable costs for the process. A control scheme for distillation columns operating under the above mentioned conditions is described in copending application Ser. No. 330,753, filed Dec. 19, 1963, entitled, "Method and Apparatus for the Control of a Continuously Operating Distillation Process."

When, however, as sometimes happens in practice, the components to be separated by distillation have increasing relative volatility at increasing pressure, then the control scheme mentioned and described in the above-identified copending application will not result in a reduction of the variable costs for the process. If, however, the process is controlled in such a way that the pressure automatically adjusts itself to the highest value at which the distillation process still produces a desired result, then accordingly as the pressure becomes higher, less reflux and vapor flow are required to attain the desired separation. This again implies the less heat need be transferred from the reboiler to the condenser to perfect the desired separation, resulting in a reduction of the variable costs for the process.

It should be noted that the economy of the distillation process usually benefits less from adjustment of the feed preheat than from the pressure being allowed to adjust itself freely. If it is desired to take full advantage of this influence of the preheating, it is necessary to ascertain whether the preheating of the feed is provided by a relatively expensive or a relatively cheap source of heat in comparison with the source employed for the re-evaporation. It is also necessary to take note of the difference and effect on the result of the distillation between heat supplied to the bottom of the column, i.e., re-evaporation, and heat supplied for the feed. By approximation, it may be said that the effect is proportional to the height of the column above the place where the heat is supplied. For example, if the feed is introduced half way up the column, the effect of the heat spent on preheating the feed is about half the effect of the same amount of heat spent on re-evaporation. In the example presented if, for example, the heat for the feed and for the re-evaporation are supplied by the same source of heat, then the cost of preheating would be relatively expensive and therefore preheating should be used as little as possible or not at all. On the other hand, if comparitively cheap sources of heat are available for the preheating, then the preheating shoud be utilized to the fullest to minimize the operating costs for the process.

It is therefore the primary object of this invention to provide a method and apparatus for controlling a process for the continuous distillation of a stream of intake mixture wherein the variable costs of operating the process are reduced to a minimum.

It is another object of this invention to provide a method and apparatus for controlling the continuous distillation of a stream of intake mixture containing components having an increasing relative volatility at increasing pressure wherein the variable costs of operating the process are reduced to a minimum.

It is a further object of this invention to provide a method and apparatus of controlling a distillation process for the continuous distillation of a stream of intake mixture wherein the pressure in the column is permitted to freely adjust itself within the permissible limits of the column pressure.

It is still a further object of this invention to provide a method and apparatus for the control of a process for the continuous distillation of an intake mixture containing components having an increasing relative volatility at increasing pressure wherein the pressure in the column automatically adjusts itself to the highest value at which the process produces the desired results.

It is still a further object of this invention to provide a method and apparatus for the control of a process for the continuous distillation of a steam of intake mixture wherein the pressure in the column automatically adjusts itself to the highest value at which the process still produces the desired results and wherein sudden pressure variations in the column are suppressed.

Briefly, according to the invention, the above objects are obtained by controlling the amount of reflux, the degree of re-evaporation, the top product flow and the bottom product flow such that the quantity of the top product formed as represented by the level of the top product accumulator, and the quantity of the liquid present in the bottom of the column vary between predetermined acceptable limits and the quality of the separation obtained satisfies the desired requirements. The supply of heat to the reboiler is then maintained at the maximum quantity which will allow the column to operate satisfactorily at a pressure which does not exceed the maximum permissible pressure for the column.

The pressure in the column is prevented from dropping below the minimum permissible value determined for the column by measuring the pressure in the column and reducing the supply of cooling medium to the condenser whenever the measured pressure drops below the permissible minimum value.

The pressure in the column is likewise prevented from rising above the maximum permissible value determined for the column by decreasing the degee of re-evaporation whenever the measured pressure rises above the maximum permissible value.

The objects and advantages of the present invention will be understood from the following description taken with reference to the attached drawings wherein.

Figure 1:
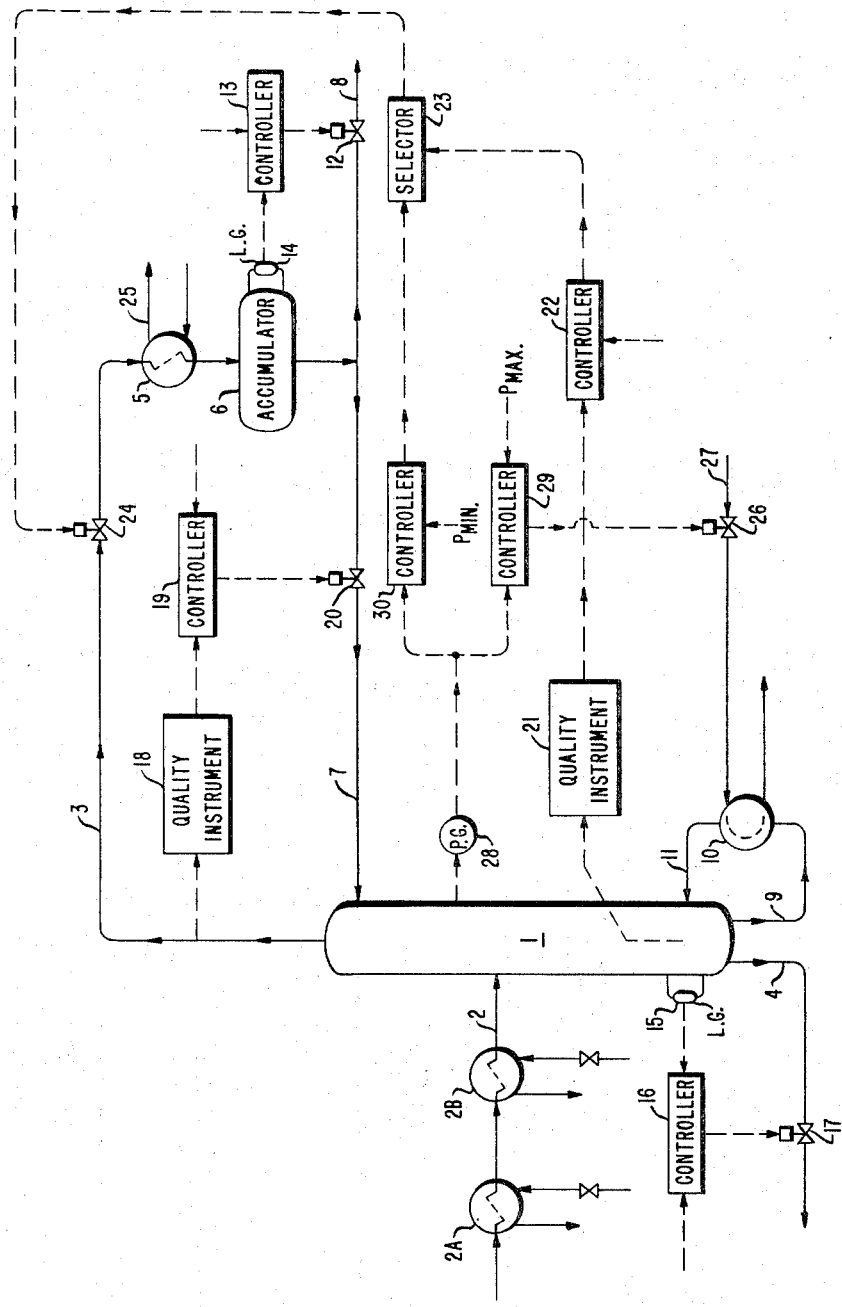
FIGURE 1 is a diagrammatic representation of the basic control scheme according to the invention.

Referring now to the drawings, wherein like reference numerals in each of the views refer to the same structure, FIGURE 1 shows a diagrammatic representation of the basic control scheme according to the invention of a distillation column 1 which contains contacting elements, such as a vertical series of bubble or valve trays, and operates at a pressure above atmospheric. The feed is continually introduced in either a liquid or vapor form into the column 1 to an intermediate stage through a pipeline 2; the top product in the vapor phase is discharged through a pipeline 3; and the liquid bottom product is discharged through a pipeline 4. Coupled to the feed pipeline 2 is a plurality of heat exchangers 2A and 2B. These heat exchangers are fully utilized to heat the feed in the event that a source of heat which is relatively cheap compared with the source of heat for the re-evaporation and which is suitable for preheating the feed is available. In the event that the source of heat is relatively expensive, the heat exchangers are not used.

Connected to the top product column discharge line 3 is a condenser 5 which condenses the vapor in the line 3; the condensate then flows into an accumulator 6. A part of the condensate from the accumulator 6 is returned to the top of the column 1 for reflux by a pipeline 7, while the liquid top product output is discharged from the accumulator via a discharge pipeline 8.

Re-evaporation for the column 1 is effected by passing a stream of liquid from the bottom of the column via a pipeline 9 to a reboiler 10 which may, for example, be a heat exchanger, and returning the heated stream via a pipeline 11 to the column 1. The particular manner in which re-evaporation is attained, however, forms per se no part of this invention since re-evaporation may be accomplished in other ways, e.g., with a heating coil in the bottom of the column.

Before discussing the particular control of the process, a distinction must be made between, inter alia, controlled conditions and correcting conditions. The controlled conditions are those variables in the process which are controlled in such a way that in general the difference between the measured value of the variable and the set or desired value of this variable is decreased. This is accomplished by adjusting other variables or correcting conditions of the process. In the present case, the amount of reflux, the degree of re-evaporation, the rate of top product flow, the rate of bottom product flow, the degree of cooling in the condenser, and the degree of preheating of the feed are suitable as correcting conditions. Of these correcting conditions, four, namely, the reflux, the re-evaporation, and the top and bottom product flows, are adjusted in dependence on the following four controlled conditions: the quality of the top product, the quality of the bottom product, the top product accumulator level, and the bottom level, i.e., the liquid level in the bottom of column 1. It should be noted that the present control scheme is conceived for a distillation process in which the feed rate may vary independently of the other conditions in the process, i.e., the distillation process should function properly irrespective of the quantity of feed supplied. Processes of this type frequently occur in oil refineries, for example, when the feed to be distilled originates from another part of the refinery and storage tanks for this feed are not available or cannot be used. The feed stream can, however, be controlled to a constant or substantially constant value without requiring any change in the basic control scheme.

As shown in FIGURE 1, the top product flow is adjusted by means of a controllable valve 12 connected in the pipeline 8. The valve 12 is controlled by means of a controller 13 which compares the measured value of the level in the accumulator 6, as determined by the level gauge 14, with a signal proportional to the desired level in the accumulator, i.e., the set value of the controller. Any differences resulting from the comparison will produce an output signal from the controller 13 which will tend to adjust the valve 12 in such a way that the difference will be decreased. Thus, if at a given moment, the measured value of the accumulator level is larger than the set or desired value, the signal supplied from the controller 13 will tend to open the valve 12 wider. In a similar manner, the bottom level is maintained at the desired value with the aid of a level gauge 15, a controller 16, and a control valve 17 in the pipeline 4.

The amount of reflux for the column 1 is controlled by means of a quality measuring instrument or meter 18 which analyzes the quality of the top products flowing through the pipeline 3 and transmits a signal corresponding to the separation to a controller 19 wherein the measured and desired quality of the top product are compared. The output signal from the controller 19 is coupled to a control valve 20 in the pipeline 7. If the measured quality is too low, the output signal from the controller 19 will tend to open the valve 20 wider and thus increase the amount of reflux; the reverse occurs if the measured quality proves to be too high.

The degree of cooling is controlled by means of a quality instrument 21 which measures the quality of the bottom product and transmits a signal corresponding to the separation obtained to a controller 22, wherein the measured and desired values of the quality of the bottom products are compared. The output signal from the controller 22 is coupled by a selector 23, which will be more fully explained below, to a control valve 24 which is shown as located in the top product pipeline 3 to the condenser 5. It should be noted, however, in lieu of placing the control valve 24 in the pipeline 3, the valve may be incorporated in either the condenser cooling medium supply line 25 or in the condenser discharge line. If at a given moment the quality of separation is too low, the valve 24 is opened wider; thereby increasing the degree of cooling. The reverse occurs if the measured quality appears to be too high.

The heating medium for the reboiler 10 is supplied through a control valve 26 by a pipeline 27. In order to allow the pressure in the column 1 to reach the highest possible value at which the process will operate satisfactorily, the control valve 26 is normally open as wide as possible, i.e., the maximum quantity of heat be supplied to the reboiler which will allow the column to operate at a pressure not exceeding the maximum permissible pressure for the column.

In order to insure that the pressure within the column does not vary outside of the permissible pressure range for the column, the pressure in the column is measured by means of a gauge 28 which is coupled to a pair of controllers 29 and 30. The controller 29 compares the value of the measured pressure with a value corresponding to the maximum permissible operating pressure ($P_{max.}$) for the column. As long as the pressure in the column is lower than $P_{max.}$, the output signal from the controller 29 will maintain the valve 26 open to the maximum extent. Should the pressure in the column become higher than $P_{max.}$, controller 29 produces an output signal which closes valve 26 an amount sufficient to bring the pressure within the column approximately equal to $P_{max.}$. Controller 30 compares the value of the measured pressure with the desired value corresponding to the minimum permissible pressure ($P_{min.}$) for the column. As long as the pressure in the column is higher than $P_{min.}$ the output signal from controller 30 is maintained at a maximum value. This output signal and that from the controller 22 are transmitted to the selector 23, which has an output signal equal to the lower value of the two input signals. Since under normal operating conditions, the pressure in the column is higher than $P_{min.}$, the output signal from the controller 30 is maintained at its maximum value; the result is that the output signal from the controller 22 is transmitted to the valve 24 to control the quality of the separation. Should the pressure in the column become lower than $P_{min.}$, however, the output signal from the controller 30 then becomes smaller in value until it is transmitted by selector 23 to the valve 24 in lieu of the signal from the controller 22; this causes the valve 24 to be closed an amount sufficient to bring the pressure in the column approximately equal to $P_{min.}$. It should be noted that for practical reasons it is recommendable to allow for a small safety margin in the set values of the controllers 29 and 30, i.e., the set values should be set at values corresponding to pressures respectively slightly below the maximum and slightly above the minimum pressures for the column.

Although with the mode of control according to the invention, the value of the pressure in the column is not controlled to a predetermined value but is merely held within a wide range within which it can vary, it is often desirable to suppress rapid pressure fluctuations in the column. Preferably this suppression of the rapid pressure fluctuations in the column is attained by means of a controller which is affected both by the measured value of one of the four-mentioned controlled conditions (particularly the quality of the separation attained) and by the pressure or pressure variations in the column, but which, in the absence of any rapid pressure condition in question. The output signal from the controller is used to control the degree of cooling.

Figure 2:
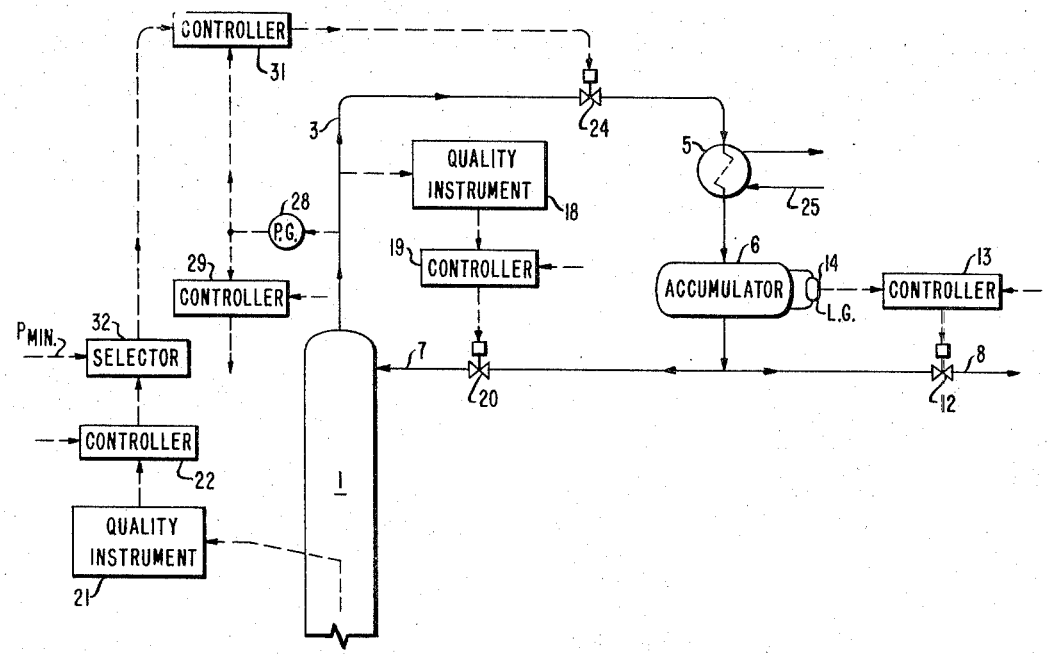
FIGURES 2-5 are diagrammatic representations of modifications of portions of the control scheme shown in FIGURE 1 for suppressing sudden pressure variations in the column.

FIGURE 2 shows a modification of the condenser control of FIGURE 1, by which any sudden pressure variations in the column are suppressed via the valve 24 which controls the degree of cooling of the condenser 5. In this embodiment, the valve 24 is controlled by means of a controller 31 to the first input of which is supplied the signal corresponding to the pressure in the column from the gauge 28 which here is shown as connected to the pipeline 3. Alternatively the gauge may be connected to any level of the column 1 (see FIGURE 1). The second input to the controller 31, which is the set point and is compared with the first input, originates in the controller 22, and is a signal corresponding to the measured value of one of the aforementioned controlled conditions, e.g., as shown in the figure, the quality of the bottom product. Before the output signal from the controller 22 is applied to the controller 31, however, the signal is passed to a selector 32 to which is also applied a set signal corresponding to $P_{min.}$. The selector 32 which functions in the same manner as selector 23 in the embodiment shown in FIGURE 1, prevents the signal from the controller 31 from attaining a value lower than that corresponding to $P_{min.}$. Although with this control scheme, the output of controller 31 will reflect any changes in pressure in column 1, since the set point of controller 31 is continually varying according to the output of controller 22, the pressure in the column will not be adjusted to any predetermined value but will still be free to adjust itself, within the predescribed range, to the optimum pressure which will result in the desired separation.

Under normal operating conditions, i.e., when the pressure neither is too high nor varies too rapidly, the degree of cooling the condenser 5 is, therefore, controlled as dictated by the quality of the separation, i.e., the output of controller 22. If, however, the pressure in the column should vary rapidly, pressure gauge 28 and thereby controller 31 will re-act sooner than the quality instrument 21 and controller 22. As a result, the valve 24 will be rapidly further closed at a sudden drop in pressure and will be rapidly opened at a sudden pressure rise, thereby suppressing the sudden pressure variation. It should be noted that in place of the pressure gauge 28 it is possible to use a gauge system having an output proportional to the rate of pressure variation.

Figure 3:
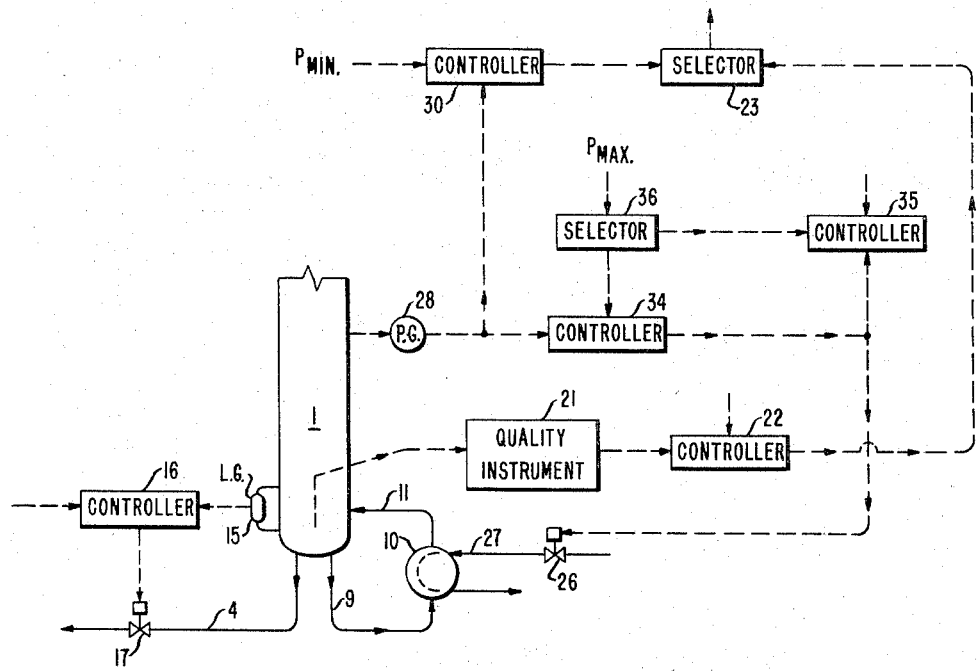

Referring now to FIGURE 3, there is shown a modification of FIGURE 1 wherein sudden pressure variations are suppressed via the control valve 26 for the supply of heating medium to the reboiler 10. In this modification, the pressure gauge 28 supplies one input signal to a controller 34, the second input of which is obtained from a controller 35. The output of controller 34, which controls the position of the valve 26, is also fed to the input of controller 35. The controller 35 compares the output signal from the controller 34 with a set value corresponding to that value of the output signal of controller 34 at which the control valve 26 would be almost fully open. Connected between the output of controller 35 and the input of controller 34 is a selector 36 to which is supplied a signal corresponding to the maximum permissible operating pressure for the column, $P_{max.}$. The selector 36 prevents the output signal from the controller 35 from attaining a value larger than $P_{max.}$. The controller 35 aims at minimizing the difference between its set value and its input signal from controller 34 by continuously adjusting the output signal of controller 34 until the latter has attained a value corresponding to that at which the control valve 26 is almost fully open. If a rapid pressure variation should occur in the column, the controller 34 will supply an output signal which is different from the desired signal, resulting in the valve 26 being either further opened or further closed depending on whether the pressure rose or fell, and thereby counteracting the sudden pressure variation in the column. As soon as the disturbance is over, the controllers 34 and 35 will return the valve 26 to the desired position.

Figure 4:
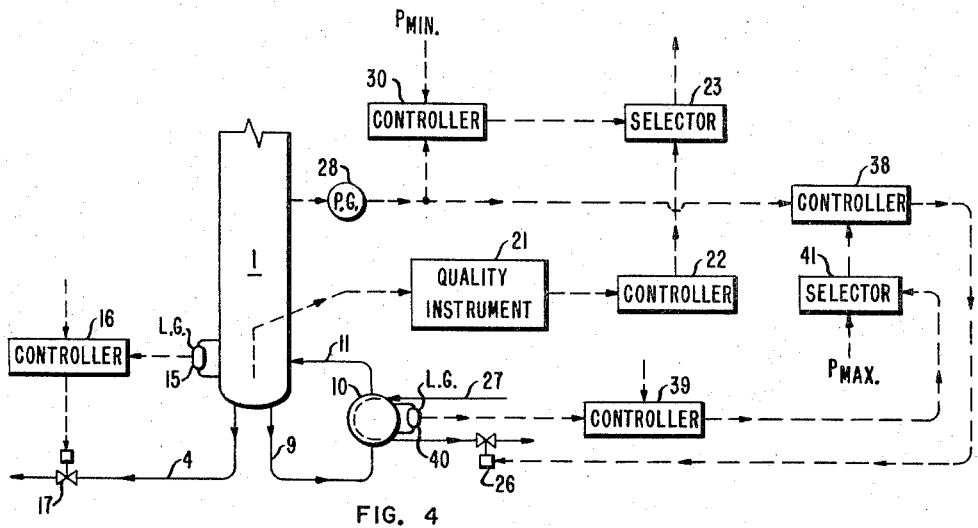

It is also possible to suppress sudden pressure variations by controlling the level of the condensate in the reboiler 10 if use is made of a condensing heating medium. As shown in FIGURE 4, the control valve 26 is located in the condensed vapor line of the reboiler 10, and is operated by a controller 38 to the first input of which is supplied the signal from the pressure gauge 28. The second input of controller 38, which is the set point and is compared with the first input, originated in a controller 39 which receives an input signal from a condensate level gauge 40. Since a low condensate level in the reboiler 10 results in operation of the reboiler at almost maximum capacity and thereby tends to produce a high pressure in the column, the second input or set value of the controller 39 corresponds to an almost minimum value of condensate level in the reboiler 10. Before the output signal from the controller 39 is applied to the controller 38, the signal is passed to a selector 41 to which is also applied a set signal corresponding to $P_{max.}$. The selector 41 prevents the signal from controller 39 from attaining a value higher than $P_{max.}$. If a sudden rise in the pressure in column 1 should occur, the output signal from the pressure gauge 28 will cause the controller 38 to begin to close the valve 26 to raise the level of the condensate in reboiler 10; this decreases the heating capacity of the reboiler 10 and results in a counteraction and thereby the suppression of the sudden pressure rise. Only when the sudden pressure fluctuation has ended and the level in the reboiler 10 has had time to rise does the level gauge 40 emit a signal indicating an increased level; the controller 39 then restores the reboiler to its normal operating condition. This may occur without an immediate change in the signal from the gauge 28, i.e., the column pressure is not held at a fixed level, but is only held below the level $P_{max.}$. Conversely, a sudden pressure drop in the column 1 will result in the controller 38 further opening the valve 26. On the other hand, upon a very gradual change in the signal from the gauge 28, any change in the position of the valve 26 due to a pressure change is soon counteracted by the controller 39.

Figure 5:
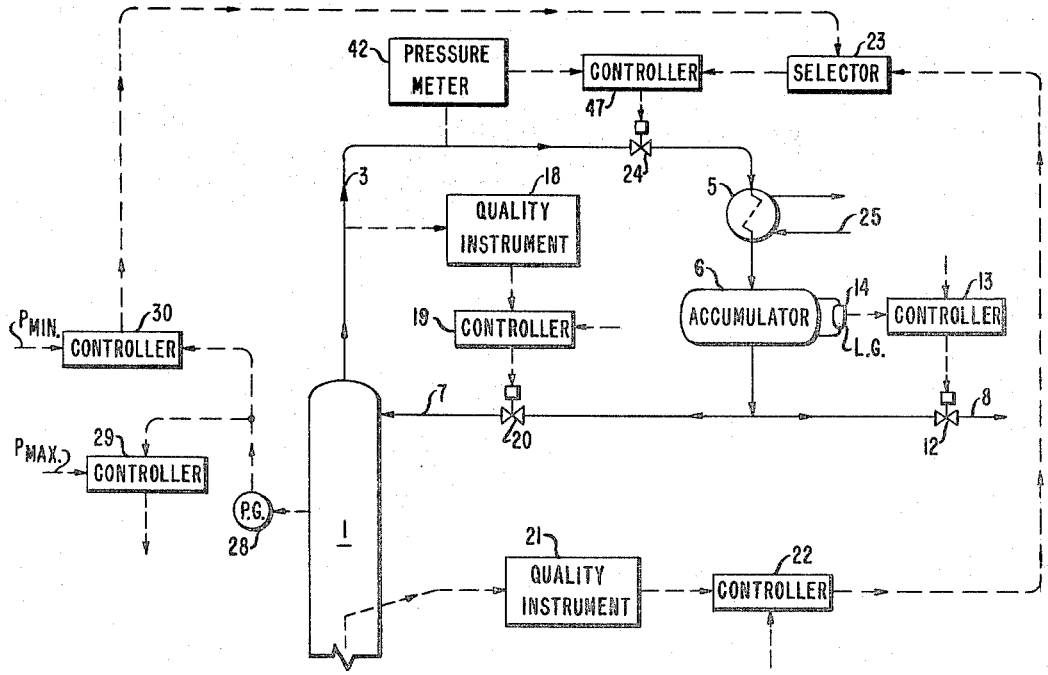

Referring now to FIGURE 5, there is shown a modification of the basic control scheme of FIGURE 1 wherein sudden pressure variations are suppressed by means of a meter 42 which produces an output signal proportional to the rate of pressure variations in the column 1. The output signal from the meter 42 is supplied to a controller 43 wherein the signal is compared with the output signal from selector 23. The output signal from controller 43 positions the valve 24. As pointed out when describing the embodiment shown in FIGURE 1, as long as the pressure in the column is above $P_{min.}$, the selector 23 will pass the signal from the quality controller 22. Therefore, under normal operating conditions, and in the absence of any sudden pressure variations in the column, the controller 43 positions the control valve 24 to produce the desired quality of separation. Only in the event of a sudden pressure variation in the column 1, does the meter 42 produce an output signal which causes the controller 43 to open further or close further the valve 24, depending on whether the pressure increased or decreased. As soon as the pressure disturbance is over, the position of the control valve 24 is again controlled by the output signal from selector 23, i.e., the output signal from controller 22 under normal operating conditions and the output from controller 30 when the pressure in the column is below $P_{min.}$.

For further illustration of the method and apparatus for control according to the invention, some additional embodiments are presented here, which give alternatives to the embodiments already presented; it being understood that these do not exhaust the possibilities of actually carrying out the process according to the invention.

Figure 6:
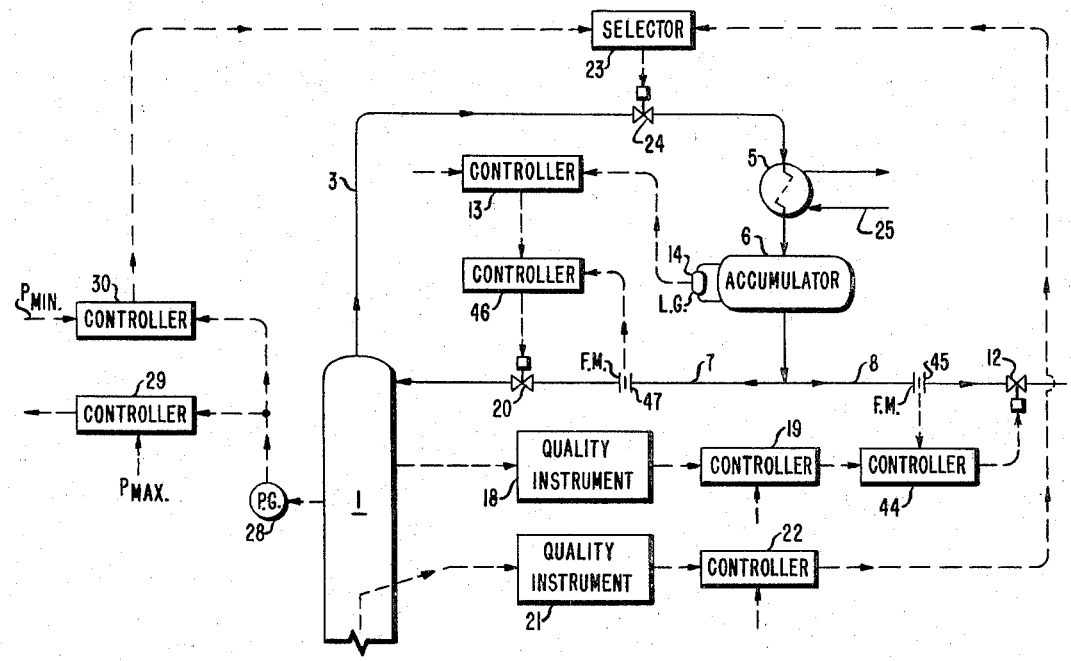
FIGURES 6-8 are diagrammatic representations indicating alternative control schemes for portions of the control scheme of FIGURE 1.

The control of the accumulator level and of the quality of the top product may take place according to the scheme of FIGURE 6. In this embodiment, the quality instrument 18 and the controller 19 provide the set value for a controller 44 which compares this signal with the indication of the product-pipeline flow meter 45. The valve 12 is then adjusted by the controller 44 such that the top product meets the quality specification. The reflux flow rate obviously increases as the valve 12 is further closed and vice versa. This reflux flow is, however, controlled to maintain the liquid level in the accumulator; this is affected by the controller 46 which operates the valve 20. The controller 46 compares the indication of the flow meter 47 with a signal from the level controller 13 which is responsive to the level gauge 14.

Figure 7:
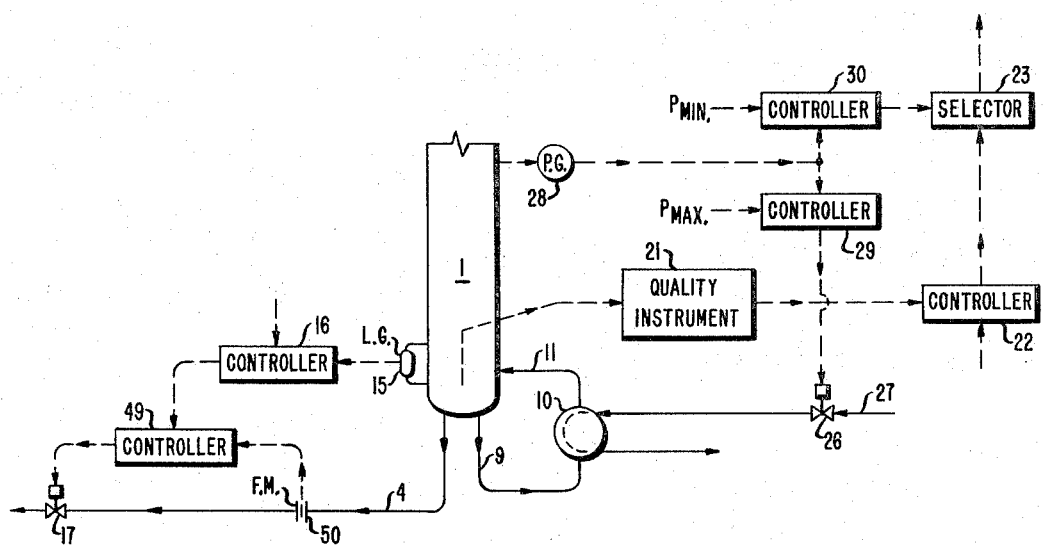

The control of the bottom level may also take place with the aid of a flow meter and a flow controller. As shown in FIGURE 7, a flow meter 48 measures the output flow of the bottom product from the column and transmits a signal to a controller 49, which sets the valve 17 in the pipeline 4. The set value of the controller 49 originates from bottom-level controller 16, which is coupled to the level gauge 15. As long as the liquid in the bottom of the column is at the desired level, the controller 49 maintains the rate of flow in the pipeline 4 at a constant value. If, however, the liquid level in the bottom of the column rises above the desired value, the signal from the controller 16 causes the controller 49 to further open the valve 17 to increase the flow through the pipeline 4 until the level in the bottom of the column decreases to the desired value. Conversely, upon a fall of the liquid level below the desired value, the controller 49 will temporarily further close the valve 17.

Figure 8:
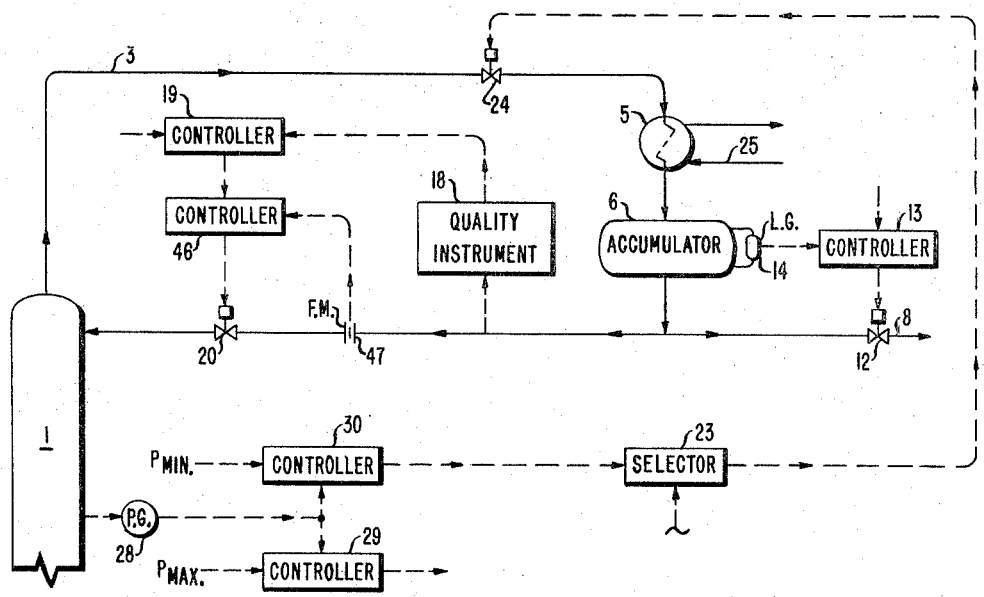

As shown in FIGURE 8, it is also possible to control the reflux by the flow rate in the reflux line 7 and the quality of the top product. As shown in the figure, the flow meter 47 in the reflux line 7 supplies a signal to the controller 46, which operates the reflux valve 20. The set value for the controller 46 is supplied by the top product quality controller 19 together with the quality meter 18. The controller 46 keeps the reflux flow constant unless the quality of the top product varies from the desired value. If the quality of the top product should change, the output signal from the controller 19 will cause the controller 46 to open further the valve 20 if the quality is below specification and further close the valve 20 if the quality is above the desired specification.

Additionally several control schemes are possible in which a ratio controller is used as one of the two quality controllers. An occasion to do so will present itself if, for instance, the quality of the separation is expressed as the boiling point of that component which is distributed equally over top product and bottom product (cut point), and as the sharpness of separation (separation index). In this case a quality meter may be used for the control of the cut point and a ratio controller for the separation index.

Figure 9:
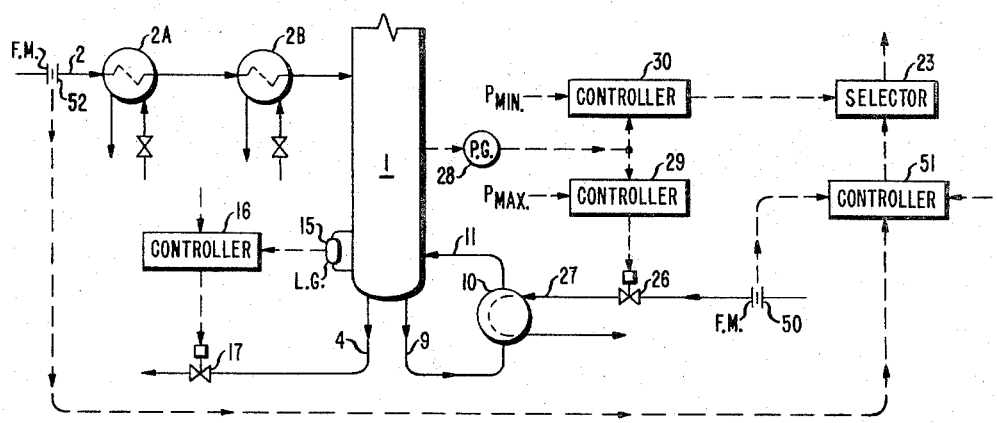
FIGURES 9-13 are schematic representations showing variations of the basic control scheme wherein ratio control is used for controlling the quality of the separation.

In FIGURE 9, a ratio controller 51 receives signals from the flow meters 52 and 50, located respectively in the feed line 2 and in the heating medium line 27. The output signal from ratio controller 51 passes in the manner hereinbefore discussed, via the selector 23 to the valve 26 (not shown in the figure) which effects the degree of cooling. The controller 51 causes the degree of cooling to conform to the feed flow by adjusting the valve 24 so that the desired ratio between feed flow and reflux is attained.

Figure 10:
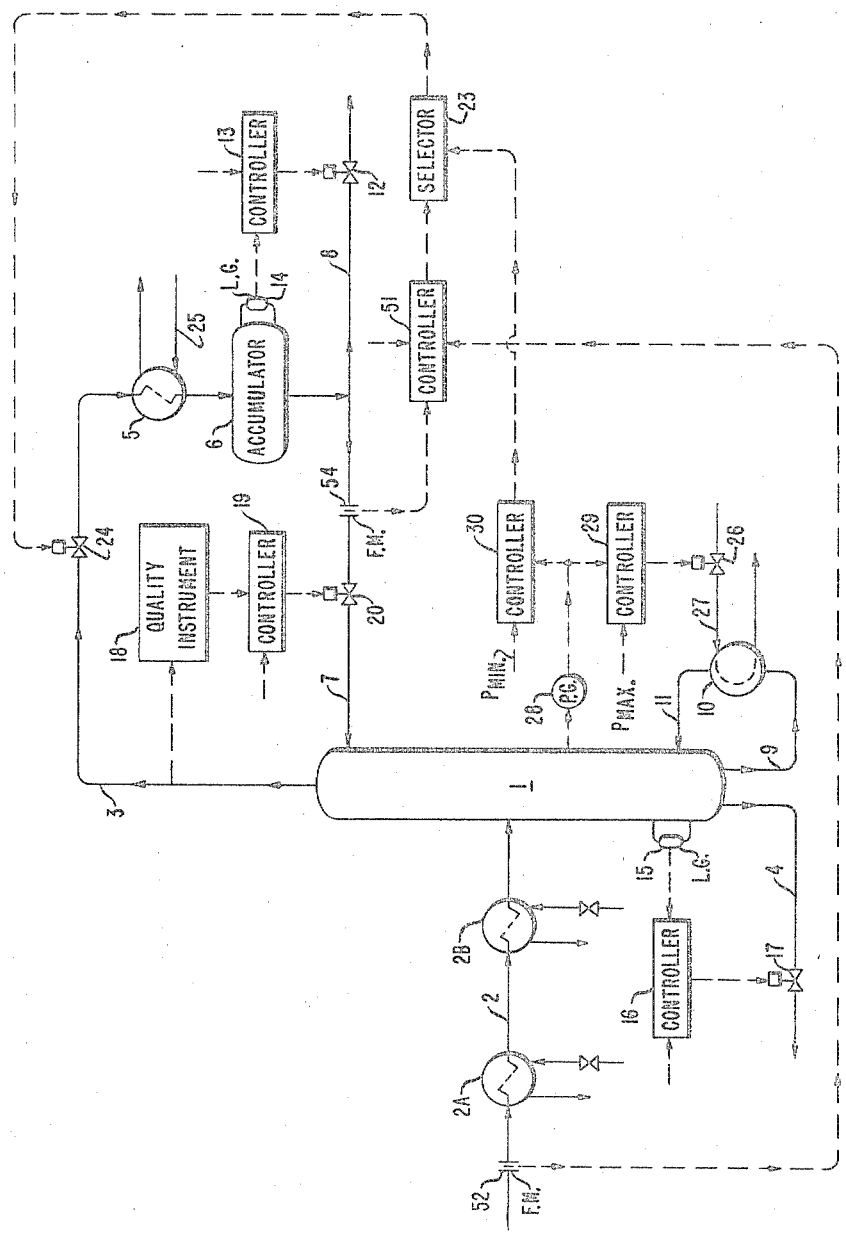
Figure 11:
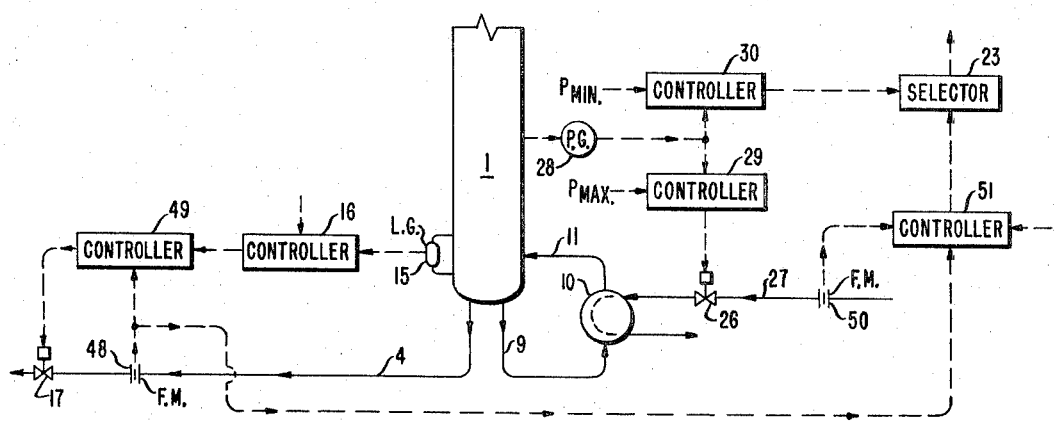

As shown in FIGURE 10, the flow meter 50 of FIGURE 9 may be replaced by a flow meter 54 in the reflux line 7 which performs the same function as the flow meter 50. As in FIGURE 9, the ratio controller 51 again controls, via selector 23 and valve 24, the degree of cooling of the condenser 5 in such a way that the controller 19 changes the reflux until the ratio between feed flow and reflux reaches the desired value. Additionally, as shown in FIGURE 11, it is possible to use the flow meter 48 in the bottom product flow line 4, in lieu of the meter 52, to act together with the flow meter 50 in the heating medium line 27 to the reboiler 10. The outputs of these two flow meters are used as the inputs to the ratio controller 51.

Figure 12:
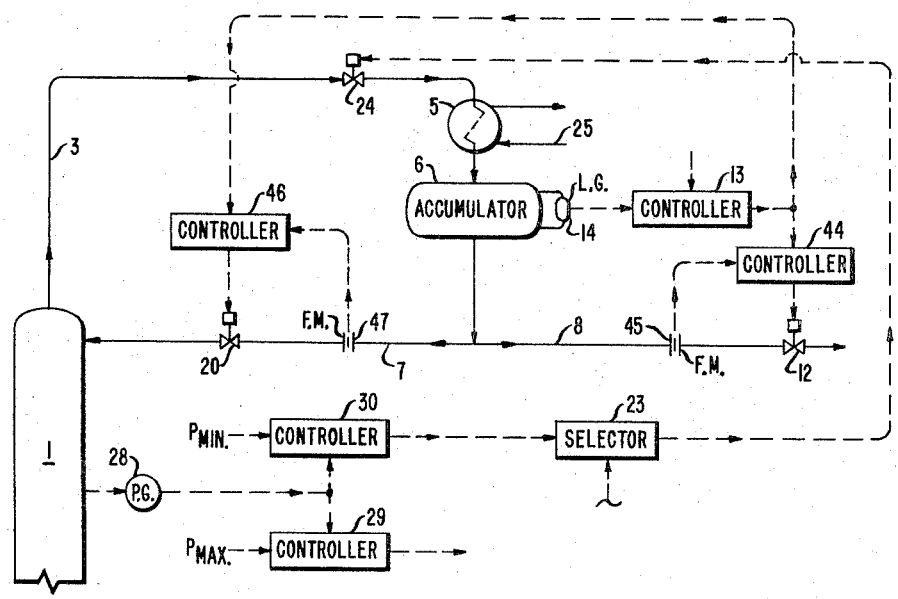
Figure 13:
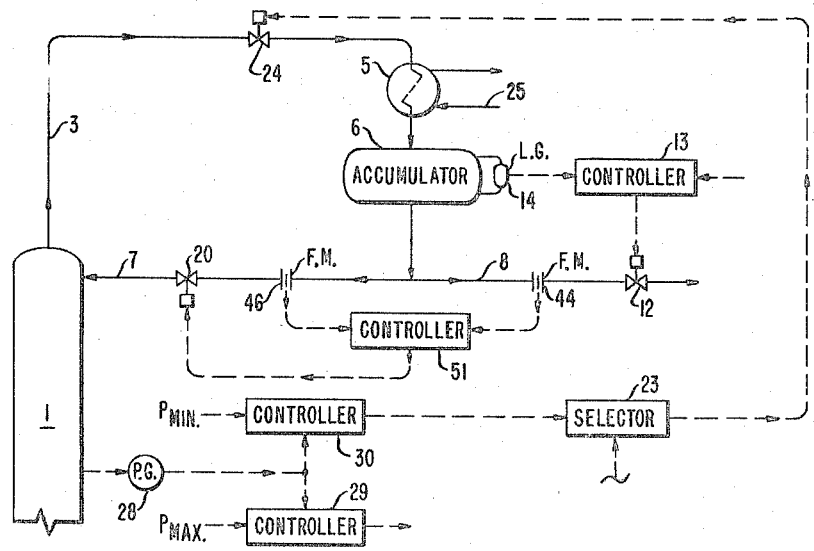

FIGURE 12 shows still another form of ratio control as an embodiment of the invention. The level controller 13, operated by the level gauge 14, supplies the set values for the controllers 44 and 46 which operate, respectively, the valve 12 in the top product flow line 8 and the valve 20 in the reflux line 7. The flow meters 45 and 47 are provided as described above and coupled to the controllers 44 and 46. With the control according to this scheme, the ratio between the top product flow and the reflux flow, as measured by the flow meters 45 and 47 respectively, and naturally also the level of the accumulator 6, are kept constant. As appears in FIGURE 13, the two meters 45 and 47 can also be connected to transmit their signals to the ratio controller 51, which then controls the reflux valve 20 in a similar manner.

A refinement of the control schemes, incorporating a ratio controller, is obtained by supplying the set value of the ratio controller via a computer, either analog or digital, which makes it possible to take account of the dependence of the desired ratio on the pressure in the column. Thus, for example at a lower pressure the reflux flow or the degree of re-evaporation can be adjusted at a relatively smaller value.

Figure 14:
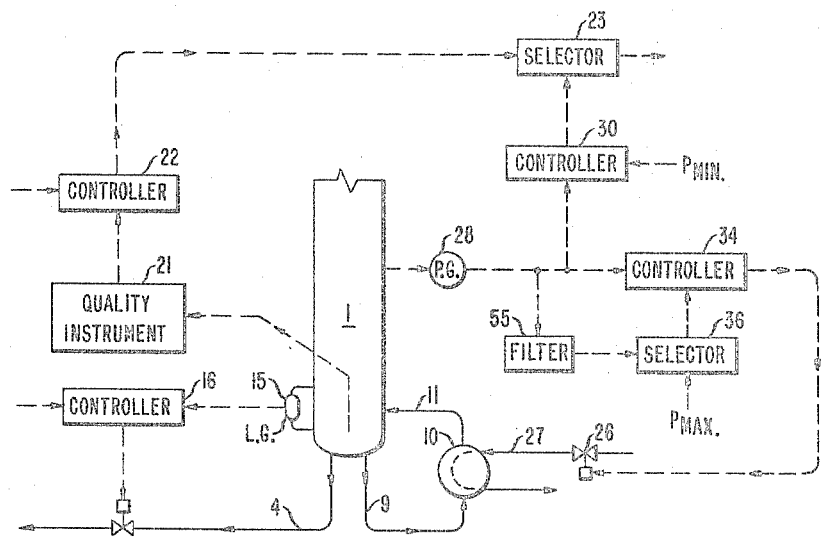
FIGURE 14 is a schematic representation showing a modification of the control scheme shown in FIGURE 3; and, FIGURE 15 is a schematic representation of an alternative control scheme for the control scheme shown in FIGURES 2 and 5.

In some cases, for instance in the control scheme as shown in FIGURE 3, where use is made of a difference between the signals from the pressure gauge 28 and the quality meter 21 in order to suppress rapid pressure variations via the control valve 26, it is attractive to make use of a damping filter as shown in FIGURE 14. The filter 55 and the selector 36 are connected between the pressure gauge 28 and one input of the controller 34 and a direct connection is provided between the pressure gauge 28 and the second input of controller 34. The filter 55 does not pass signal variations originated by rapid pressure variations. These signals pass via the direct connection to the controller 34, which then, as explained above, adjusts the valve 26. Only signals originating from slow pressure variations are passed by the filter 55. Of course, such signals also follow the direct course from the pressure gauge 28 to the controller 34. However, the two signals are fed to the control mechanism of controller 34 in opposition in such a way that they cancel each other. As a result, slow pressure variations below $P_{max.}$ no longer have any influence on the position of the control valve 24. However, when $P_{max.}$ is exceeded the selector 36 transmits an overriding signal to the controller 34 to move the valve 24 toward closed position.

Figure 15:
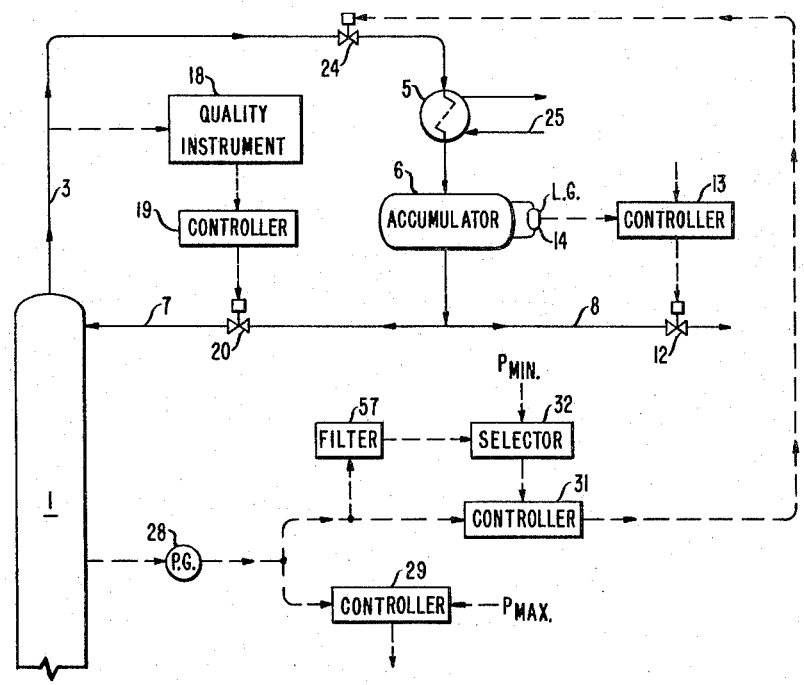

A filter of this type can also be applied in the control scheme at the top of the column, which provides an alternative to the schemes shown in FIGURE 2 or FIGURE 5. As shown in FIGURE 15 the output signal from pressure gauge 28 is passed to the controller 31 and to damping filter 57. Any signal fluctuation originating from a rapid pressure variation is not passed by the filter 57 to the selector 32 but reaches controller 31 unimpeded, and can, therefore close the valve 24 if the pressure drops rapidly, or open it wider upon a rapid rise in pressure. So long as the pressure is above $P_{min.}$, any signal originating from a slow pressure variation reaches the controller 31 at the same instant of time both via the filter 57 and directly via the connection between gauge 28 and controller 31. These signals arrive in the controller 31 in opposition, in such a way that they cancel each other, so that no change is made to the position of the valve 24. However, when the pressure falls below $P_{min.}$ the selector 32 emits an overriding signal to move the valve 24 toward closed position.

The selector 36 of FIGURE 14 and the selector 32 in FIGURE 15 are optional. When omitted, the column pressure is not monitored as regards maximum or minimum pressures by the elements shown in these views which function merely to detect rapid fluctuations; such monitoring is then affected by one of the schemes previously described e.g., in connection with FIGURE 1 or 5.

It is understood that the quality meter mentioned hereinbefore may be direct quality meters such as chromatographic analysis apparatus, infrered or ultra-violet absorption apparatus, viscometers, refractive index meters, or flash point meters. For this purpose one may also use temperature meters compensated for pressure variations, meters for the difference in temperature between two trays, meters for the difference in vapor pressure between the product obtained and the desired product or, under certain conditions, controllers for the ratio of two flows. It is further understood that it is not necessary to connect the quality meter directly to the top product or the bottom product discharge lines leading from the column. Sometimes it may be desirable, for instance in view of the accuracy of the quality meter, to connect this meter to the mixture on a selected tray in the column having regard to the nature of the distillation process to select a stage which is effective to yield meaningful data on which control can be based. Furthermore, it is understood that the control systems mentioned hereinbefore may be pneumatic, hydraulic, electric, electronic or mechanical systems or may constitute a mixture of these types.

I claim as my invention:

1. In a process for the continuous distillation of a stream of an intake mixture at superatmospheric pressure in a multistage distillation column in which overhead vapors are condensed a top product condenser and both reflux in the upper portion and re-evaporation in the bottom portion of the column occur, and wherein the re-evaporation is provided from a heat supply which is regulated by a control valve, and wherein the amount of reflux, the degree of cooling, the top product flow and the bottom product flow are controlled such that the top product accumulator level and the bottom product level are adjusted to predetermined respective levels and the desired quality of the top and bottom products attained, the improvement comprising:

operating the column while permitting the pressure to freely vary between the maximum and minimum pressure limits for the column;

completely opening the control valve in the heat supply for re-evaporation of the bottom portion of the column;

measuring the pressure in the column to obtain a signal related to said pressure; and closing said control valve in response to said signal when the pressure in the column approaches said maximum pressure limit.

2. The process of claim 1 wherein the column pressure is maintained between the maximum and minimum permissible pressures for the column by: measuring the pressure in the column; decreasing the supply of cooling medium to the condenser whenever the measured pressure is below a preset value corresponding to the minimum pressure limit; and, decreasing the degree of re-evaporation whenever the measured pressure is above a preset value corresponding to the maximum pressure limit.

3. The process of claim 2 wherein the degree of cooling is controlled in response to a signal proportional to the difference between (1) a signal proportional to the measured pressure in the column and (2) a signal proportional to the quality of at least one of the products of the distillation, whereby sudden pressure variations in the column are suppressed without the pressure itself being controlled to a constant value.

4. The process of claim 2 wherein the quantity of heat supplied to the reboiler is controlled by a control signal proportional to the difference between (1) a signal proportional to the measured pressure and (2) a signal proportional to the difference between said control signal and a fixed signal, the value of said fixed signal corresponding to the desired control signal, whereby sudden pressure variations in the column are suppressed without the pressure itself being controlled to a constant value.

5. The process of claim 2 wherein sudden pressure variations in the column pressure are suppressed without the pressure itself being controlled at a constant value by the additional steps of: producing a reference signal proportional to the difference between (1) a signal proportional to the condensate level in the reboiler and (2) a preset value equal to substantially the minimum allowable value of the condensate level in the reboiler; and, controlling the supply of heating medium to the reboiler in accordance with the difference between (1) a signal proportional to the pressure in the column and (2) said first mentioned difference signal.

6. The method of claim 2 wherein the quantity of heat supplied to the reboiler is controlled by a signal proportional to the difference between (1) a signal proportional to the rate of pressure variation in the column and, (2) a signal proportional to the difference between a signal proportional to the pressure in the column and a signal proportional to the maximum column pressure limit, whereby sudden variations in column pressure are suppressed without the pressure itself being controlled to a constant value.

7. Apparatus for the control of a process for the continuous distillation of a variable stream of an intake mixture carried out at a pressure above atmospheric in a distillation column, said column having a feed inlet conduit, a top product discharge conduit and a bottom product discharge conduit, said column in addition having means to reflux a portion of the top product and re-evaporate a portion of the bottom product, the improvement comprising: means for measuring the quality of the top product from said distillation column and producing a signal proportional thereto; means responsive to said quality output signal for controlling the reflux through said distillation column to bring the quality of the top product within the desired predetermined limit; a condenser and an accumulator coupled to the top product discharge line; means for measuring the level of the product in the top product accumulator and producing an output signal proportional thereto; means responsive to said accumulator signal for controlling the output flow of the top product from said accumulator; means for measuring the level of the product in the bottom of said distillation column and producing an output signal proportional thereto; means responsive to said bottom level output signal for controlling the output flow of the bottom product from the bottom of said column to maintain the bottom level within a predetermined range; a first control valve coupled to said condenser for controlling the degree of cooling therein; a reboiler connected to the bottom portion of said distillation column; a second control valve connected in the heating medium line of said reboiler, said second control valve being normally maintained in an almost fully opened condition; means for measuring the pressure within said column; means coupled to said first control valve for adjusting said first control valve to control the degree of cooling of said condenser to maintain the quality of separation in the distillation column at a predetermined value, said means including: means coupled to said first control valve and responsive to the output of said pressure measuring means for adjusting said first control valve to maintain the pressure within said column above the minimum permissible operating pressure for said column; and, means coupled to said second control valve and responsive to the output of said pressure measuring means for adjusting said second control valve to the maximum open position which will maintain the pressure in the column below the maximum permissible column operating pressure.

8. The apparatus of claim 7 wherein said means for controlling the degree of cooling of said condenser comprises: means for measuring the quality of the bottom product and producing an output signal proportional thereto; a first controller for producing an output signal proportional to the difference between said signal proportional to the quality of the bottom product and a signal proportional to the desired quality of the bottom product; a second controller, said pressure-measuring means being coupled to said second controller for producing a first distinctive output signal whenever the pressure in the column is less than the minimum permissible operating pressure for said column; selector means having a first input thereof connected to the output of said first controller and having a second input thereof connected to the output of said second controller for coupling one of said first and second controller outputs to said first control valve, said selector means coupling the output of said second controller to said first control valve only when said first distinctive output signal is present; and, wherein said means for adjusting said second control valve comprises third controller means, said pressure-measuring means being coupled to said third controller means for producing a second distinctive output signal when the pressure in the column exceeds the maximum permissible pressure for the column, the output of said third controller means being coupled to said second control valve.

9. The apparatus of claim 7 wherein said means for adjusting the degree of cooling supplied by said condenser comprises: means for measuring the quality of the bottom product in said column; first controller means coupled to said quality measuring means for producing an output signal proportional to the difference between the measured and desired quality of the bottom product; selector means having the output from said first controller means applied to one input thereof and having a signal proportional to the minimum permissible column pressure applied to a second input thereof, said selector means passing the lesser of said two input signals; a second controller means having one input thereof coupled to the output of said selector means and a second input thereof connected to the output of said pressure measuring means, said second controller means producing an output signal proportional to the difference between said two input signals; said first control valve being coupled to the output of said second controlled means.

10. The apparatus of claim 7 wherein said means for adjusting said second control valve comprises: a first controller having one input coupled to the output of said pressure measuring means, the output of said first controller being coupled to said second control valve and to one input of a second controller; said second controller producing an output signal proportional to the difference between the output signal from said first controller and a signal proportional to the desired position of said second control valve; selector means having the output signal from said second controller applied to one input thereof and a signal proportional to the maximum permissible column pressure applied to a second input thereof, said selector means producing an output signal proportional to the lesser of said two input signals, the output signal from said selector means being coupled to a second input of said first controller; said first controller producing an output signal proportional to the difference between the output signal from said selector means and the output signal from said pressure measuring means.

11. The apparatus of claim 7 wherein said second control valve is connected in the condensed vapor line of said reboiler and wherein said means for adjusting said second control valve comprises: means for measuring the condensate level in the reboiler and producing an output signal proportional thereto; a first controller coupled to the output of said condensate level measuring means for producing an output signal proportional to the difference between the measured condensate level and the desired condensate level; means connected to the output of said first controller for preventing the output signal from attaining a value greater than that corresponding to the maximum permissible column operating pressure; a second controller coupled to the output of said last mentioned means and to the output of said pressure measuring means for producing an output signal proportional to the difference between the two input signals to said second controller, the output of said second controller being coupled to said second control valve.

12. The apparatus of claim 7 wherein said means for adjusting said first control valve comprises: means for measuring the quality of the bottom product and producing an output signal proportional thereto; a first controller for producing an output signal proportional to the difference between said signal proportional to the quality of the bottom product and a signal proportional to the desired quality of he bottom product; a second controller for producing a distinctive output signal whenever the pressure in the column is less than the minimum permissible operating pressure for said column; selector means having a first input thereof connected to the output of said first controller and having a second input thereof connected to the output of said second controller for selecting one of said input signals and producing an output equal thereto; said selector means selecting the output of said second controller only when said distinctive output signal is present; a third controller having one input connected to the output of said selector means and a second input connected to the output of a means for producing a signal proportional to the rate of pressure variations in said distillation column, said third controller producing an output signal proportional to the difference between the two input signals thereto; said second control valve being coupled to the output of said third controller.

13. In an apparatus for the continuous distillation of a stream of intake mixture at superatmospheric pressure in a multistage distillation column in which both reflux in the upper portion and re-evaporation in the lower portion of the column are used, wherein a condenser and a accumulator are connected to the distillation column to receive the top product, reboiler means are connected to the bottom portion of the distillation column, said improvement comprising:

a top product flow control valve; said top product flow control valve being disposed to control the flow of top product from the column to the condenser;

a botom product flow control valve, said bottom product flow control valve being disposed to control the flow of bottom product from said column;

a heat flow control valve, said heat flow control being disposed to control the heat supplied to said reboiler;

pressure-measuring means, said pressure-measuring means being disposed to measure the pressure in the column;

a first controller, said pressure-measuring means being coupled to said first controller, said first controller comparing the measured pressure with a set point representing the maximum pressure limit of the column, said first controller being coupled to said heat flow control valve to continuously open said heat flow control valve until the measured pressure substantially equals the maximum pressure limit and then close said heat flow control valve until the measured pressure falls below the maximum pressure limit;

a second controller, said pressure-measuring means being coupled to said second controller, said second controller comparing the measured pressure with a set point representing the minimum pressure limit of the column, said second controller being coupled to said top product flow control valve to continuously open said top product flow control valve until the measured pressure substantially equals the minimum pressure limit and then close said top product flow control valve until the measured pressure rises above the maximum pressure limit.

References Cited
UNITED STATES PATENTS

| | | | |
|---|---|---|---|
| 2,104,310 | 1/1938 | Roelfsema | 196—141 |
| 2,489,949 | 11/1949 | Blair | 196—132 |
| 2,504,464 | 4/1950 | Stanley | 196—132 |
| 2,910,521 | 10/1959 | Cobb | 203—2 |
| 2,990,437 | 6/1961 | Berger | 196—132 |
| 3,018,230 | 1/1962 | Morgan | 196—132 |
| 3,018,310 | 1/1962 | Van Pool | 196—132 |
| 3,034,307 | 5/1962 | Berger | 62—37 |
| 3,108,929 | 11/1963 | Tolin et al. | 202—160 |
| 3,224,947 | 12/1965 | Lupfer | 202—160 |

NORMAN YUDKOFF, *Primary Examiner.*

WILBUR L. BASCOMB, JR., *Assistant Examiner.*